United States Patent [19]

Nakayama

[11] Patent Number: 5,084,770

[45] Date of Patent: Jan. 28, 1992

[54] IMAGE COMMUNICATION APPARATUS

[75] Inventor: Tsutomu Nakayama, Yokohama, Japan

[73] Assignee: Konica Corporation, Tokyo, Japan

[21] Appl. No.: 549,929

[22] Filed: Jul. 9, 1990

[30] Foreign Application Priority Data

Jul. 18, 1989 [JP] Japan .................................. 1-185671
Jul. 18, 1989 [JP] Japan .................................. 1-185672

[51] Int. Cl.$^5$ ........................................... H04N 1/00
[52] U.S. Cl. ............................. 358/403; 358/400; 358/402; 358/434; 358/440
[58] Field of Search ............... 358/403, 407, 402, 400, 358/434, 440, 476

[56] References Cited

U.S. PATENT DOCUMENTS

| | | | |
|---|---|---|---|
| 4,187,520 | 2/1980 | Beduchaud et al. | 358/450 |
| 4,675,742 | 6/1987 | Ogata | 358/498 |
| 4,811,111 | 3/1989 | Kurokawa | 358/440 |
| 4,870,503 | 9/1989 | Miura | 358/434 |
| 4,941,170 | 7/1990 | Herbst | 358/440 |

Primary Examiner—Jin F. Ng
Assistant Examiner—Thomas D. Lee
Attorney, Agent, or Firm—Finnegan, Henderson, Farabow, Garrett, and Dunner

[57] ABSTRACT

The present invention relates to an image communication apparatus for use in facsimile or the like for transmitting and receiving a plurality of image data files as a batch. An identifier data is automatically added to each image data file to be transmitted along with the image data for the purpose of identifying each of the data files from other files when a batch of files has been reserved for transmission. A reservation number is displayed and a reservation receipt is printed out at the time of reservation.

2 Claims, 12 Drawing Sheets

| SENDER (USER) | DOCUMENT | START TIME | RECEIVER TERMINAL | RESERVE No |
|---|---|---|---|---|
| P | DOCUMENT 1 | T1 | A, B, C | 11 |
| Q | DOCUMENT 2 | T2 | A, B, C | 21 |
| P | DOCUMENT 3 | T1 | A, B, C | 12 |
| R | DOCUMENT 4 | T3 | A | 31 |
| S | DOCUMENT 5 | T2 | A, B | 41 |

TIME OF RESERVATION

RESERVATION RECEIPT

1988 / 09 / 16      Sat. A.M. 8 : 30
987 - 654 - 3210
ABC - DEF

| RESERVE No. | 11 |
|---|---|
| TIME TO TRANSMIT | A.M. 10 : 30 |
| FROM | 1 2 3 4 ) G H I - J K L M |
| RESERVED AT | A.M. 8 : 30 |
| TO | ABBREV. No. ) *03   012 - 345 - 6789 |
| TOTAL PAGE | 12 |

FIG. 5

FORMAT OF TRANSMISSION CONFORMATION REPORT

No. = 000001

| RESERVE No. | 11 |
|---|---|
| PESERVED AT | A.M. 8 : 30 |
| TRANSMITTED AT | 1988 / 09 / 16    A.M. 10 : 20 |
| REQUIRED TIME | 3 m   9 s |
| FROM | ABC - DEF<br>987 - 654 - 3210<br>SYSTEM - SOFTWARE - GROUP<br>ABC - DEFG |
| TO | GHI - JKLM<br>ABBREV. No.) *03   012 - 345 - 6789 |
| TOTAL PAGE | 05 |
| ERROR PAGE | P. 02 |
| RESULT | T 242 |
| TYPE | G 3 |
| RESOLUTION | NORMAL |

90 : CANCELLATION PROCESSING

FIG. 13

110: ONE-ADDRESS PROCESSING

FIG. 12

100: MULTI-ADDRESS PROCESSING

FIG. 14

120 : ONE FILE PROCESSING

FIG. 15

140 : ONE PAGE PROCESSING

FIG. 16

IMAGE COMMUNICATION APPARATUS

BACKGROUND OF THE INVENTION

This invention relates to an image communication apparatus suitable for a facsimile which has the function of batch transmission.

One use of a facsimile is to transmit a plurality of documents individually or in groups to a single or a plurality of terminals (facsimiles). For example, documents "1", "2", and "3" are required to be transmitted individually or in groups to terminals "A", "B", "C" and "D".

This requirement can occur when a plurality of documents are transmitted from a head office of a corporation to its branches.

For instance, when document "1" is required to be transmitted to terminal "A" or to terminals "A" and "B" at a predetermined time $T_1$, document 1 may be set to be stored in the memory and then the sequential transmitting function may be operated.

Another operation of the facsimile operation can be that each of the documents "1", "2", and "3" is required to be transmitted to each of a plurality of terminals. However, conventional apparatus do not have the function of transmitting a plurality of different files stored in the memory to a plurality of terminals.

The function of transmitting a plurality of different files stored in the memory in a lump to each plurality of terminals is defined now as the batch transmission function. When a plurality of files are transmitted with this batch transmission function, the transmission is usually conducted as a reserved transmission. For example, when documents are transmitted during the time while the rent for the communication line is low, that transmission is almost always conducted as a reserved transmission.

It is preferable that the contents of the reservation be confirmed because it is normal that the facsimile operator is not present at the facsimile machine when the reserved transmission is conducted.

Sometimes, reservation must be cancelled. In that case, it is preferable that the identification information is attached to the reserved file so that the information can be used as a mark. For instance, when a reservation number corresponding to the file is attached, the reservation can be cancelled according to the reservation number.

The page numbers put on received documents at the terminal which has received a plurality of documents are usually serial numbers. The numbers generally do not have any relations hip to with the transmitted files. Consequently, it is difficult to distinguish the transmitted files at the receiver side. Especially when a plurality of files have mutual relations with one another, it is difficult to distinguish and sort them.

When a plurality of documents are transmitted to a single terminal or a plurality of terminals, the sender of each document is different in many cases. A sender is called a user in this specification hereafter. Therefore, it is difficult to distinguish the users.

SUMMARY OF THE INVENTION

Accordingly, it is an object of the present invention to provide an image communication apparatus which can smoothly conduct the reservation processing.

It is another object of the present invention to provide an image communication apparatus which can easily distinguish each of the received files at the receiver side.

In order to attain the first object of the present invention, a reservation number is indicated on the display portion of the apparatus when communication is reserved and at the same time a reservation receipt to represent the reservation is outputted.

The transmission reservation procedure is described as follows. After a document is set on the apparatus, the transmission start time and the destination of the document are designated by the user. Then, an adequate reservation number is allotted to the reservation and the reservation number is displayed in the display unit. After that, the memory-in processing of the document is conducted. During timer polling reception reservation, in which the memory-in processing is not necessary, memory-in processing is necessary and skipped. When the memory-in processing is completed, the reservation receipt is printed out and the input processing is completed.

The transmission start time (the scheduled time), the sender, the destination, and the number of sheets of the documents other than the reservation number, are indicated on the reservation receipt.

The reservation can be cancelled according to the reservation number and the contents of the reservation can be confirmed according to the reservation receipt.

In order to attain the second object of the present invention, the apparatus of the present invention has a means to automatically attach the identification signals to the files stored in the memory so that the files can be distinguished from each other on the receiver's side when a plurality of files are transmitted in a lump. When the files are transmitted, these identification signals are attached to the file and are transmitted.

The page number can be used as an identifier to be represented by the identification signal. Other than the page number, the user ID or the combination of the page number and the user ID, can be used as the identifier. The combination of them and the transmission confirmation report can be also used as the identifier and the selection is conducted by the operator.

An example in which the page number is used as the identifier will be explained below. When the document to be transmitted is filed, the page information of the file is stored in the information file (I file). When the number of pages is 10> the information that the page number = 10 is registered in I file. This page information is registered at each document to be transmitted.

At the start of each page transmission the page information of the I file is referred to and the page information is attached so that the page information can be in serial order from page to page.

As the page information is sent to the receiving side together with the image information of the document, the page numbers are recorded in serial order at a prescribed position of the received sheet. The page number is renewed at each file and a new number is put on a new file.

DETAILED DESCRIPTION OF THE INVENTION

Figure 1:
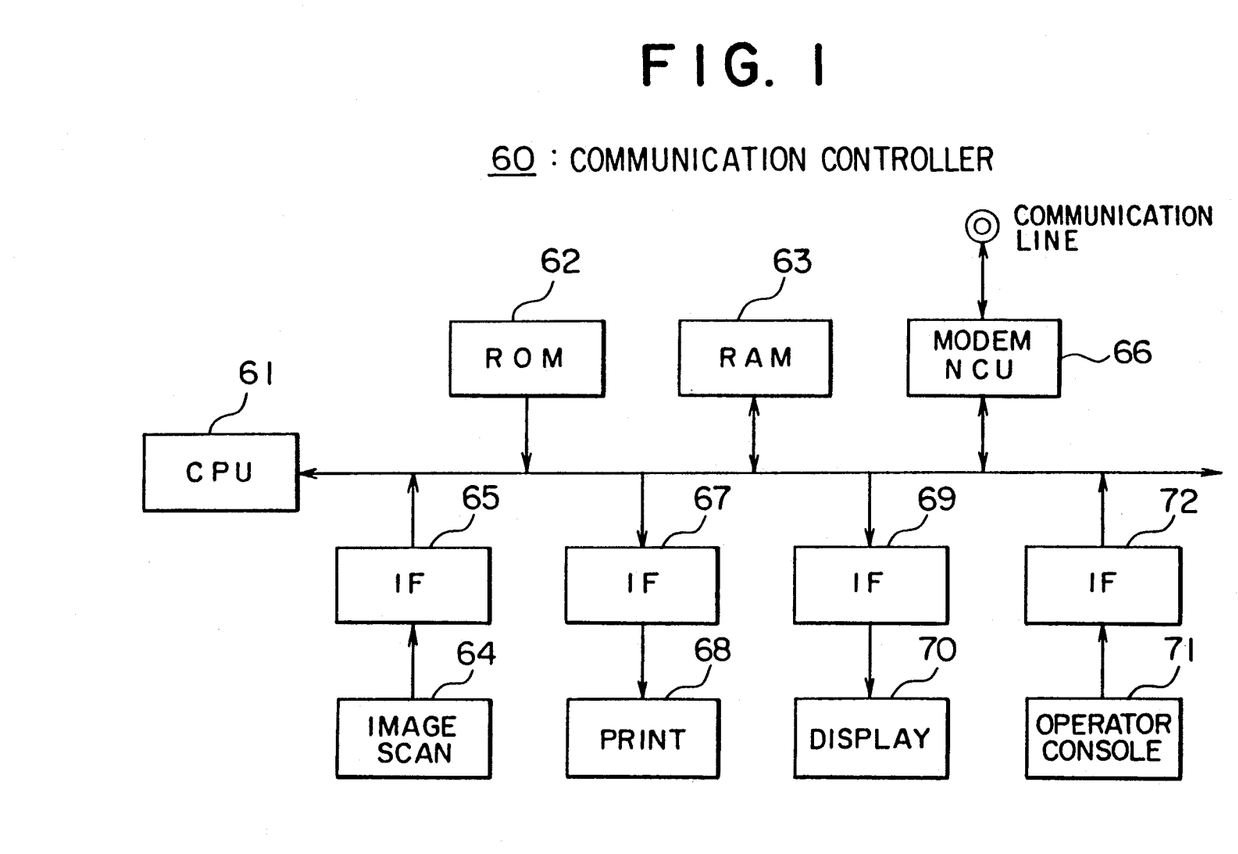
FIG. 1 is a schematic flow diagram of the communication controller of the image transmitting apparatus of the present invention.

Referring to FIG. 1, an example of the image transmitting apparatus of the present invention will be explained in detail.

The facsimile, which is a kind of image communicating apparatus, has the normal function of facsimile. In this case, the normal function comprises reserved transmission, sequential communication, polling, abbreviated dial registration, one-touch-dial registration and the like.

First of all, the communication controller 60 built in the facsimile will be explained referring to FIG. 1.

In FIG. 1, the numeral 61 is a CPU which controls the communication. The numeral 62 is a ROM in which various kinds of control programs are stored. The numeral 63 is a RAM in which received image information and information to be transmitted are stored.

The image information which was read out by the image scan unit 64, which is the image-reading-out-unit, is stored in RAM 63 and supplied to MODEM and the network control unit (NCU), or the image information is directly supplied to MODEM and NCU through the interface 65. The image information inputted from the transmission line is once stored in RAM 63 through MODEM and NUC 66, or directly supplied to the printer 68 through the interface 67 so that the received document can be printed out.

The telephone number of the receiver is displayed in the display unit 70 as it is supplied to the display unit 70 through the interface 69.

The operator console 71 which is installed in the facsimile, is provided with a selection means (not illustrated in the drawing) which can select batch transmission, relay communication including simultaneous relay communication, and the like. When the operator console is operated, the content of the operation is inputted into CPU 61 through the interface 72.

When a plurality of documents are required to be transmitted to a single or a plurality of destinations at a certain start time, the documents to be transmitted to the same destination are sent in a lump, which is called multi-batch-transmission.

Figure 2:
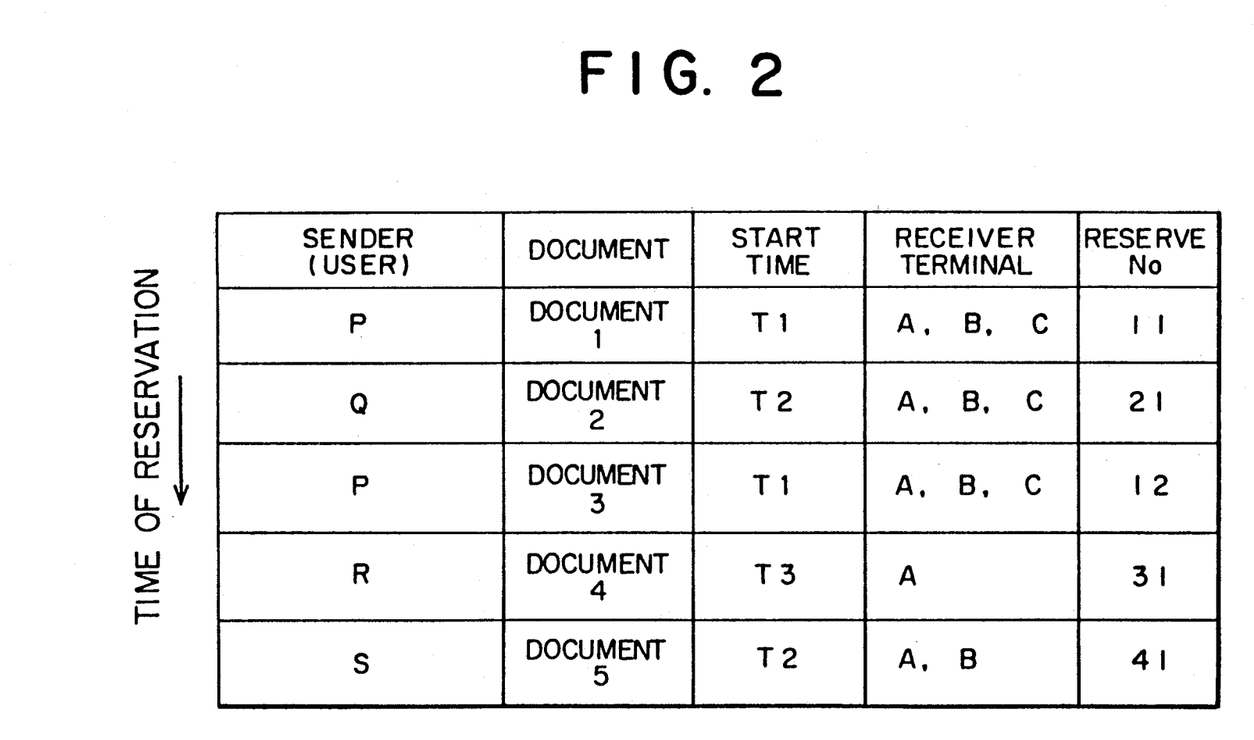
FIG. 2, is a table which shows the reservation numbers in the case of batch transmission.

For example, as shown in FIG. 2, user P inputs the data in order to transmit the document 1 to the destinations (the terminals) A, B, and C at start time T1. At a different time, user P inputs the data in order to transmit the document 3 to the destinations A, B, and C at the same start time T1.

User Q inputs the data in order to transmit the document 2 to the destinations A, B, and C at start time T2. User R inputs the data in order to transmit the document 4 to the destination A at start time T3. User S inputs the data in order to transmit the document 5 to the destinations A and B at start time T2.

In the case described above, the start time T1 is the same with regard to the documents 1 and 3 and the destination of the documents 1 and 3 is the same, too. In this case, the documents 1 and 3 are transmitted in a lump, which is batch transmission.

However, as far as the documents 2, 4, and 5 are concerned, the start time is different or the destinations are different. Accordingly, batch transmission can not be conducted and the documents 2, 4, and 5 are transmitted separately.

When the data of a document is inputted, a reservation number is assigned to each document so that the user can easily distinguish whether the transmission is batch transmission or not. Also, the user can use the reservation number as a mark when the reservation is cancelled. In this example, the reservation number is represented by the number of 2 figures. The figure of 10 represents the batch and the figure of 1 represents the file (the document) in the batch transmission. The figure of 10 differs at each batch transmission. Therefore, 4 types of batch transmission are conducted in the example illustrated in FIG. 2. The figure of 1 is increased each time the file differs.

For that reason, when the reservation number is a number of 2 figures, it is possible to conduct a maximum of 10 (ten) batch transmissions and to designate a maximum of 10 (ten) documents in a batch transmission.

When batch transmission is conducted, an identifier represented by the identifying signal is assigned to each document to be transmitted. The page number, the user ID and the transmission confirmation report can be used as the identifier. When they are put into practical use, they can be optionally combined by the user.

When both the page number and the user ID are used as the identifier, the page number is assigned to the received page in numerical order and the user ID, for instance the user's name is assigned to each sheet to be received, wherein the page number and the user ID are renewed at each file. These identifiers are attached to the image information beforehand and transmitted together with the image information.

The operation procedure of batch transmission will be explained as follows.

After the document has been set on the apparatus and the transmission menu has been selected, the transmission start time is designated. Then, the screen to indicate the destination is automatically displayed on the display unit 70. When a switch to designate a plurality of destinations is pressed, the document can be transmitted to all the designated destinations by scanning the document once. When an abbreviated number is registered to a destination, the destination is designated by the abbreviated number. When one-touch-dial-number is registered, the registered destination is designated by the one-touch-dial-number.

After the destination is designated, a set switch is operated and batch transmission is started. Then, the data of the file is inputted into the memory. After that, the reservation number is displayed on the display unit 70 and the reservation receipt, which is also called the batch transmission receipt (Refer to FIG. 4.), is printed out (Refer to FIG. 3.).

When the reservation must be cancelled, the reservation number is used as the reference number. The reservation receipt is used in order to confirm the contents of the reservation, and when a mistake is found in the reservation, it is possible to reset the reservation so that the mistake can be corrected. As it is possible to display the contents of the reservation on the display unit 70, the operator can also prohibit the output of the reservation receipt, if necessary.

Figure 4:
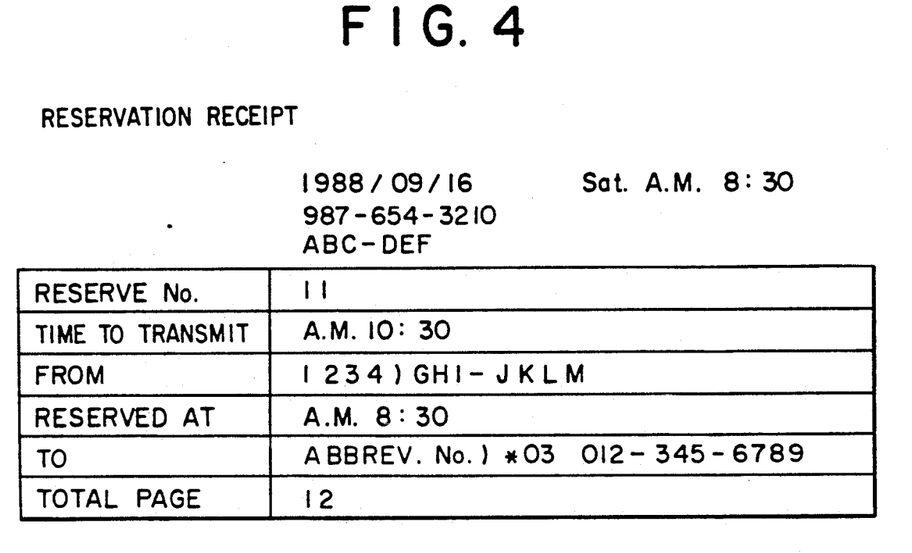
FIG. 4 is an illustration which shows a reservation receipt.

As illustrated in FIG. 4, the transmission start time, the sender, the destination, and the number of sheets to be transmitted other than the reservation number are written on the reservation receipt.

When the data of the image is inputted, the following files are made.

I File

This is a file of information relating to the image. In this file, the information on a document as a whole, (total page number etc.) and the information on each sheet of document (the line density, the size, and the like) are stored.

P File

This is an image data file in which the compressed image data is stored.

J File

This is a file of information about jobs to be carried out in which the destination, the transmission start time, the user ID, and the reservation number are stored. Batch transmission is conducted using these 3 files.

When the image data is inputted to the apparatus, the message indicating the apparatus is under transmission reserved mode, the transmission start time and the destination are displayed on the screen of the display unit.

When the apparatus is under transmission reserved mode, the following processing can be conducted using the operator console.

(1) To cancel the reservation

The reservation cancel menu is designated by pressing the menu switch and the reservation number to be cancelled is designated. Then, the information about the reservation is displayed. After ensuring that the displayed information about the reservation is to be cancelled, the set switch is operated. Then, the reservation can be cancelled. This procedure is effective in preventing an erroneous operation.

(2) Interruption processing

When the stop switch is pressed, the apparatus is in the mode of interruption. Consequently, another transaction, such as transmission or copy can be conducted.

(3) Automatic receiving

When an incoming call has arrived, it can be automatically received without any operation by the operator.

Figure 3:
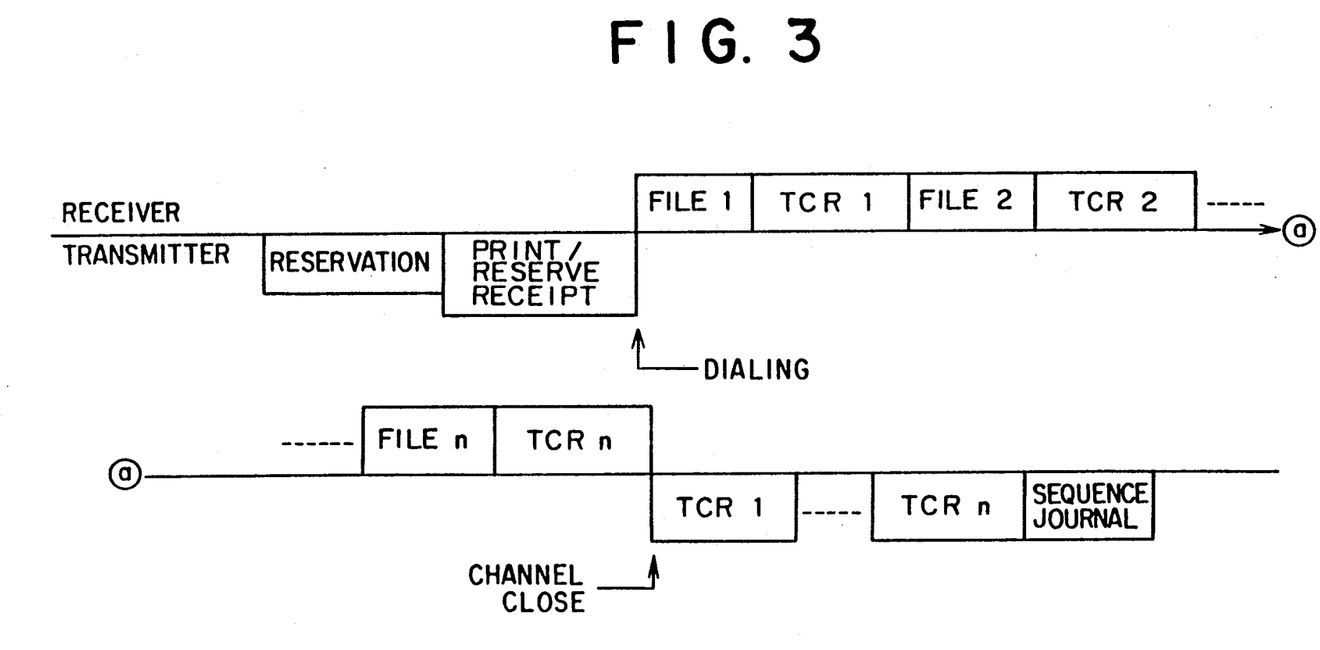
FIG. 3 is a schematic illustration which shows the communication conducted between a transmitter and a receiver.
Figure 5:
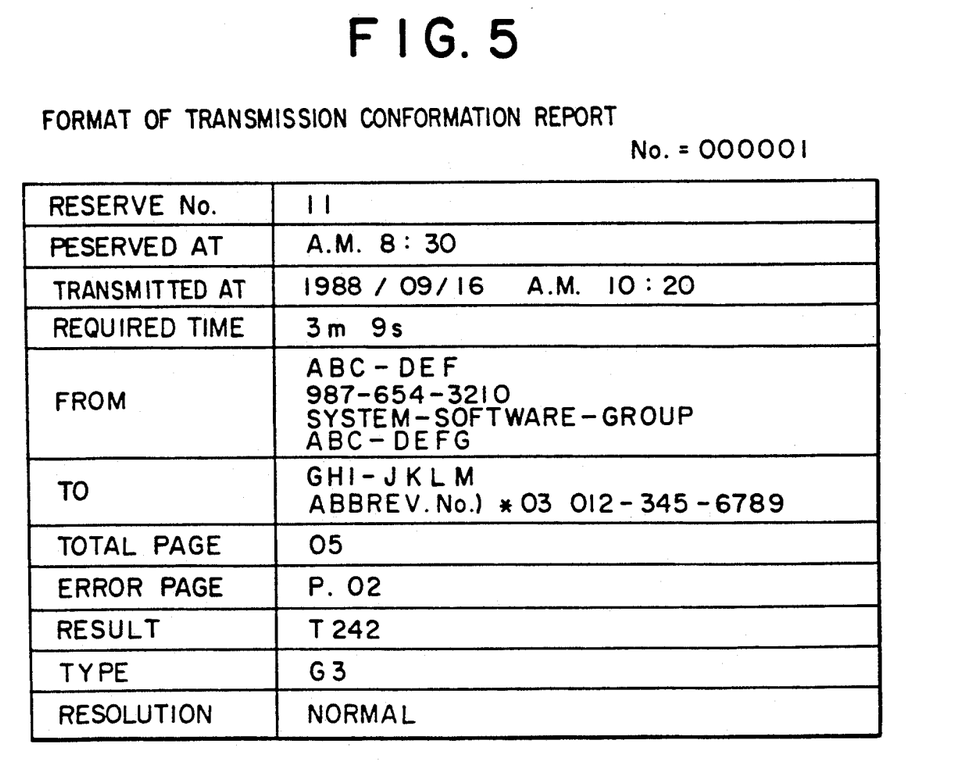
FIG. 5 is an illustration which shows a transmission confirmation report.

When batch transmission is started, the data is transmitted in numerical order of the reservation number. To be more concrete, the file which has the smallest reservation number is transmitted, then the next smallest reservation number among the rest of the files is transmitted, and so on. As illustrated in FIG. 3, when a file has been transmitted, the transmission confirmation report of the file (Refer to FIG. 5.) is transmitted. This operation is conducted each time a file is transmitted. A sender, a receiver, the number of sheets to be transmitted and so forth are written on a transmission confirmation report.

Figure 6:
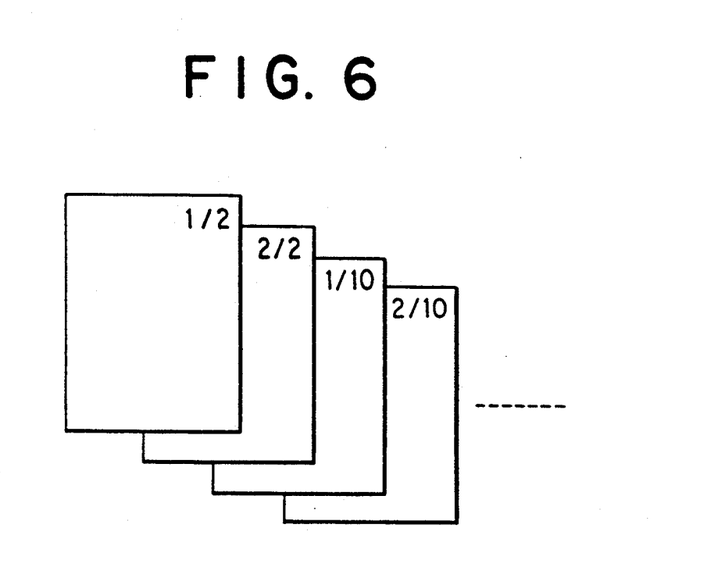
FIGS. 6, 7, 8, and 9 are illustrations which show examples of identifier.
Figure 7:
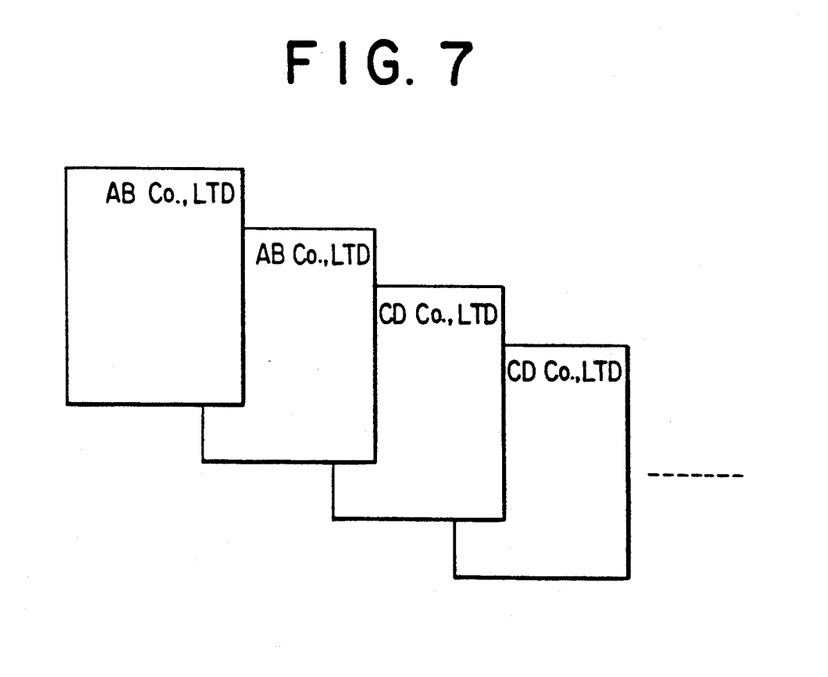
Figure 8:
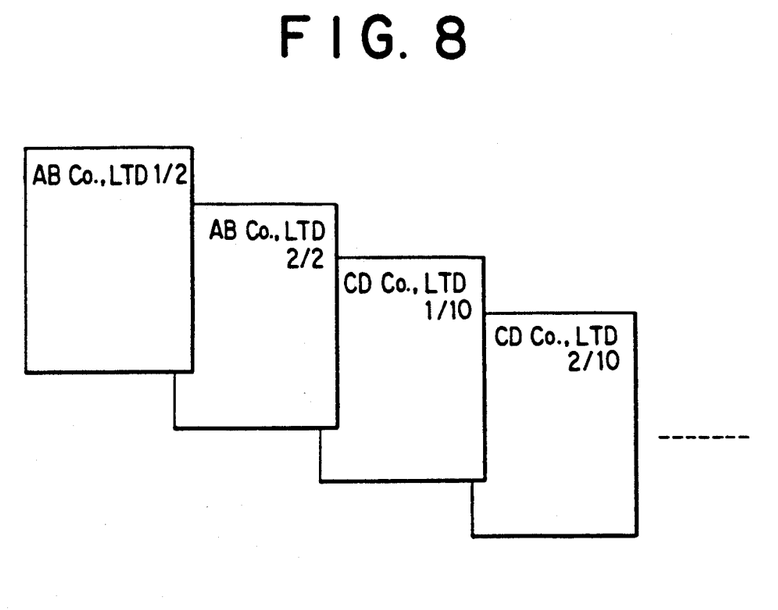
Figure 9:
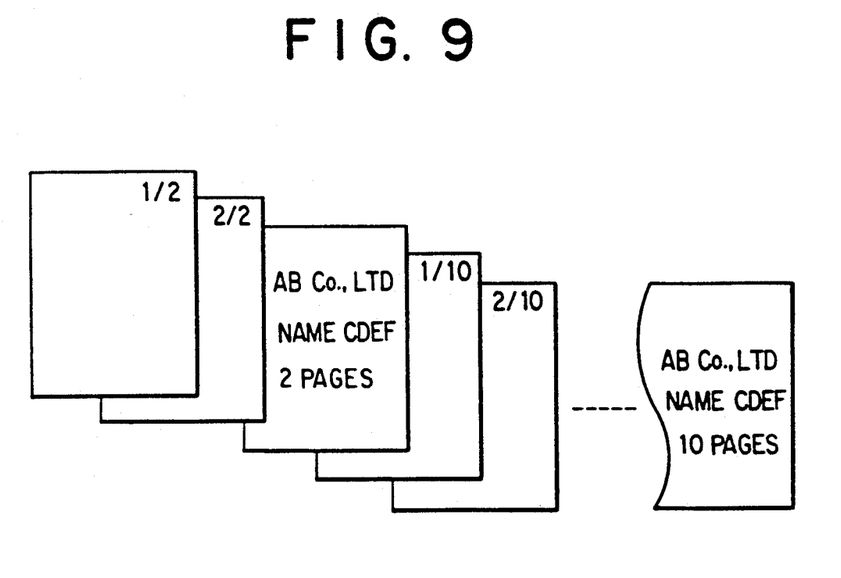

An identifier is attached to each page to be transmitted. FIG. 6 illustrates an example in which the page number is used as the identifier. FIG. 7 illustrates an example in which the user ID is used as the identifier. FIG. 8 illustrates an example in which both the page number and the user ID are used as the identifier. FIG. 9 illustrates an example in which the page number and the user ID are attached and furthermore the transmission confirmation report is transmitted right after each file has been transmitted. After the end of the transmission the confirmation reports are printed out.

These identifiers can be optionally combined and the user can select the combination.

When only the page number is used as the identifier, serial numbers are attached to each page so that the order of the received pages can not be mistaken. However, under these circumstances, the sender of the file can not be identified.

When only the user ID is used as the identifier, only the user ID is changed at each file. Therefore, the order of the transmitted pages can not be confirmed.

When both the page number and the user ID are used as the identifier, the above-described disadvantages can be eliminated.

When the transmission confirmation report is used as an identifier as well as the page number and the user ID, the information about the sender can be transmitted so that the receiver can get further information about the transmission.

Flow charts which illustrate the above-described operation procedure are shown in FIGS. 10 to 15. In this example, the page number, the user ID, and the transmission confirmation report are used as the identifier. When only the page number, the user ID, and the transmission confirmation report are used as the identifier, the procedure is almost the same as the example illustrated in FIGS. 10 to 15. Therefore, explanation of that procedure is omitted.

Figure 10:
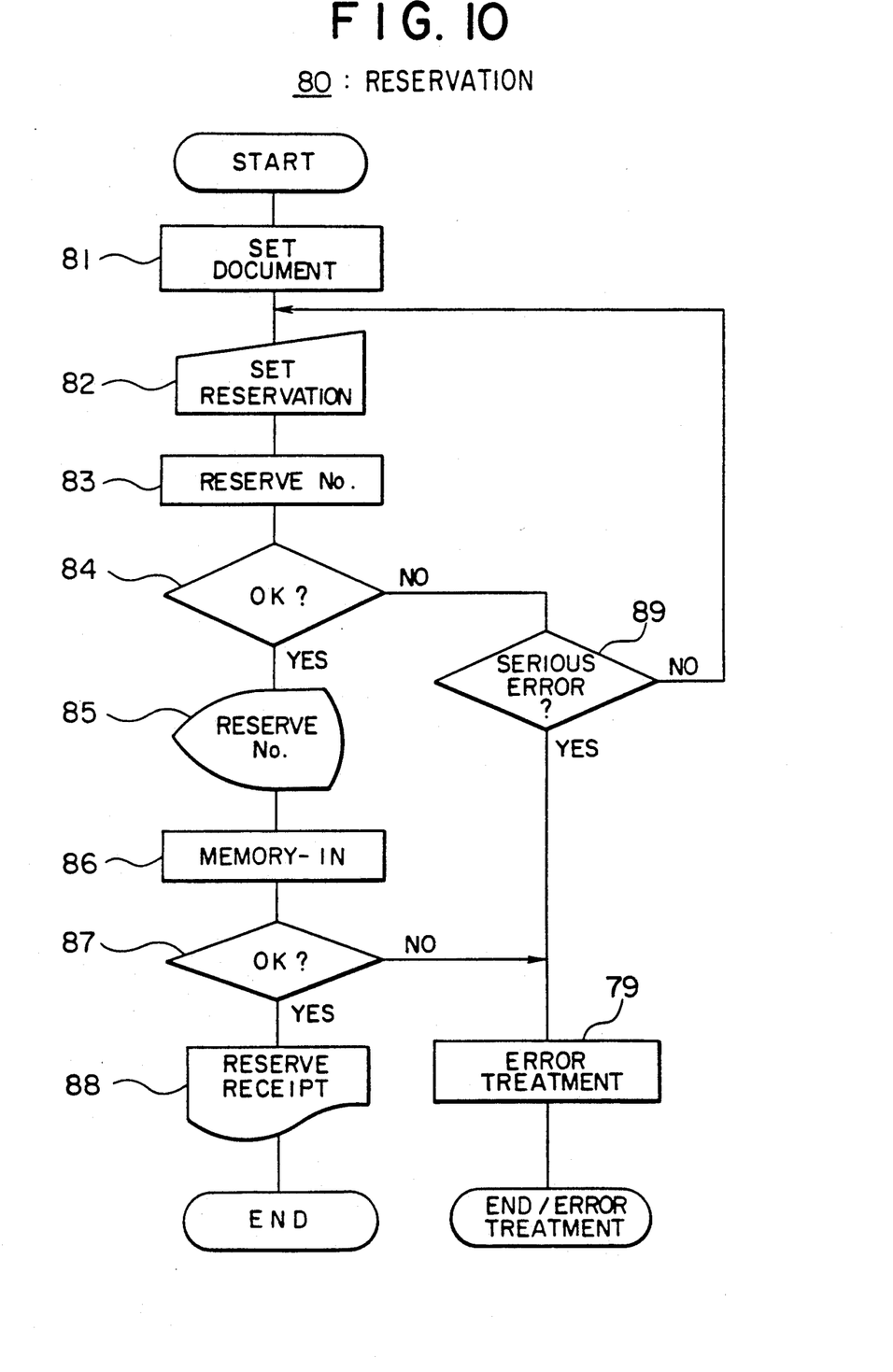
FIGS. 10, 11, 12, 13, 14, and 15 are flow charts which illustrate batch transmission.

FIG. 10 illustrates procedure 80 to process the input of batch transmission. After setting a document to the apparatus, the transmission start time and the destination are inputted to the apparatus by the user. The apparatus checks the unoccupied reservation number. When an adequate unoccupied reservation number is found, the number is designated as the reservation number of the transmission (steps 81, 82, 83, and 84). After the reservation number is displayed in the display unit 70, the data about the document is stored in the apparatus as the process of memory-in (steps 85 and 86). If the reservation does not need the memory-in process such as timer polling, step 86 is skipped.

When the memory-in process is normally completed, the reservation receipt is printed out and all the inputting process is completed (steps 87 and 88). However, when the memory-in processing has not been normally conducted, error processing is started (steps 87 and 79).

When the reservation designated in the step of 84 can not be carried out, whether it is caused by a serious error or not is checked. When it is not a serious error, the setting is conducted again. However, when it is a serious error, the mode of the apparatus is changed to the error processing mode and the error processing such as display of error is conducted (step 89 and 79).

Figure 11:
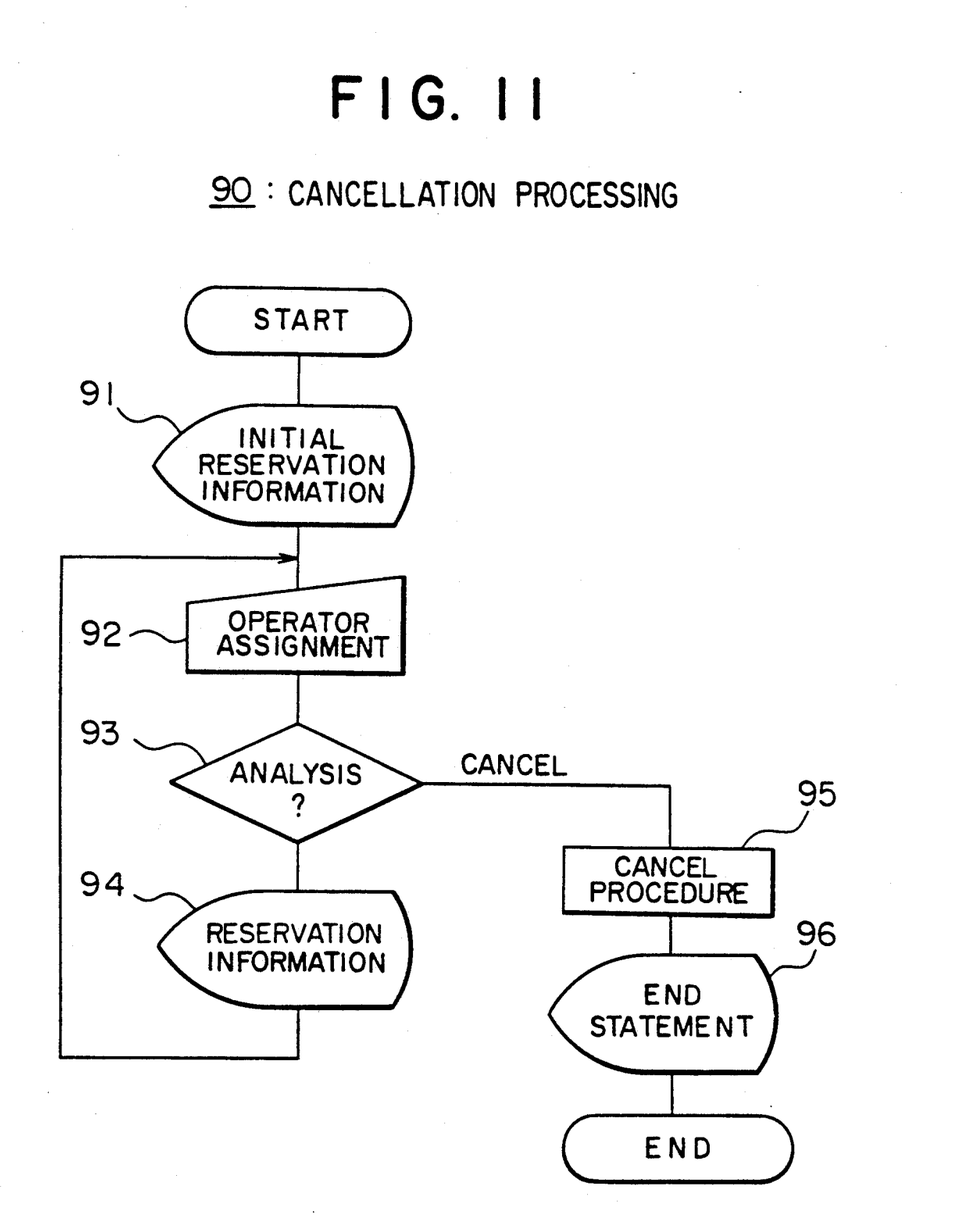

FIG. 11 illustrates an example of reservation cancel processing routine 90. When this mode is selected, the reservation information is displayed on the display unit 70 (step 91). The reservation information comprises the reservation number, the transmission start time (the reservation time), the kind of reserved jobs, the destination, the sender, and the like. When there are a plurality kinds of reserved information, the information is displayed in order of priority.

The priority is given to the reserved information according to the importance of the job, the order of the transmission start time, and the order of the reservation number.

When the reservation information is displayed, the apparatus waits for the operator's direction and the direction is analyzed (steps 92 and 93). When the direction is only an input of the reservation number, the contents of the reservation are displayed. When the direction is to cancel of the reservation, the reservation cancel processing is conducted. After that, the display of the completion of cancel processing is displayed (steps 93, 94, 95, and 96).

Figure 12:
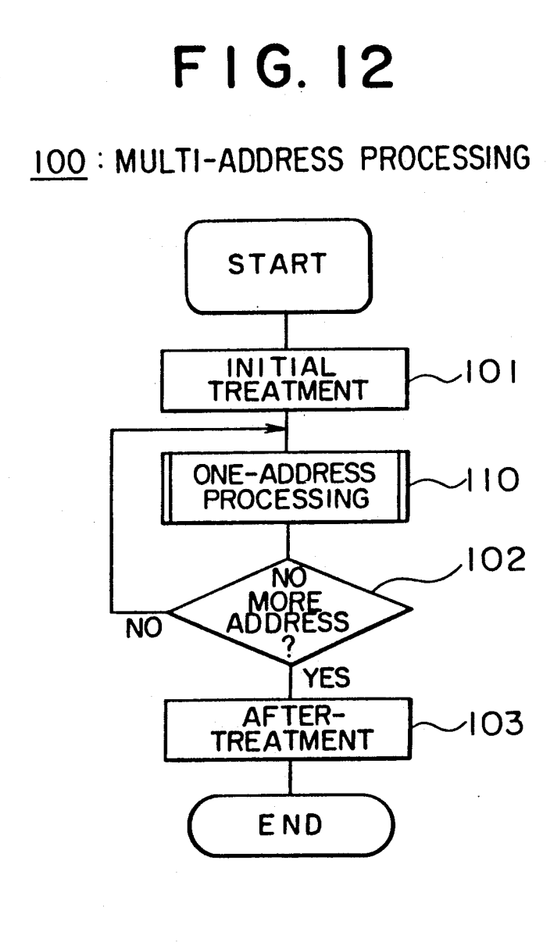

FIG. 12 is an overall flow chart of batch transmission. In the batch transmission processing, shown as multi-address processing 100 in FIG. 12, the initial processing is conducted first. When batch transmission, in which the transmission is conducted to a plurality of addresses, a file is placed in a mode in which the heading data for the sequential communication report is written (step 101). As shown in FIG. 3, the sequential communication report is a report (a sequential communication journal) to be printed out on the sender's side in which the terminal station, the transmitting time and the number of transmitted sheets are recorded.

Each time when the address is changed, the transmission data is written in this file and added to the heading data. After the transmission the data is printed and then the file is erased.

After the initial processing, the transmission is conducted to each address. The transmission process is completed by conducting the transmission to all addresses (steps 110, 102, and 103), wherein this process is defined as the termination process. The termination process comprises the print processing of the sequential communication report and the data file erasing processing after the print processing is completed.

Figure 13:
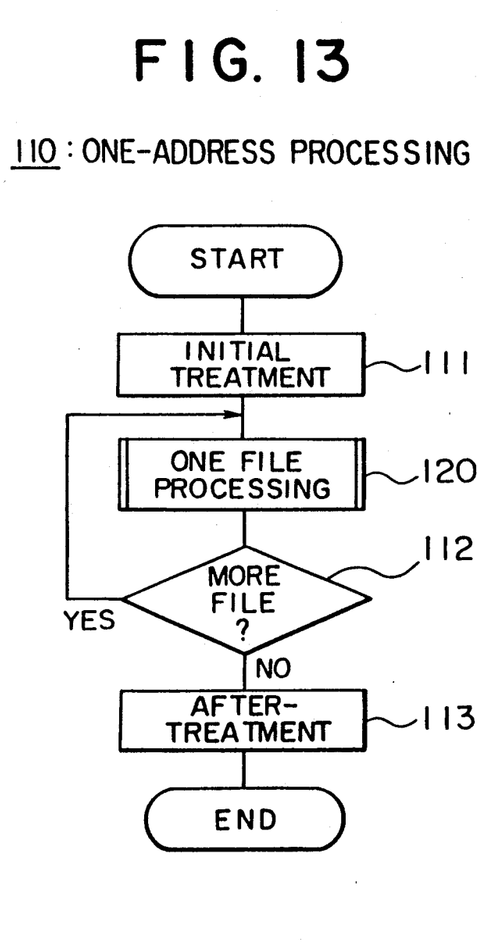

FIG. 13 illustrates an example of address processing 110. When this sub-routine is called for, the first address is read out from J file at the initial processing. This first address is dialed in order to set the calling. After the calling is set, a file processing is conducted (step 111 and 120). When there is a following file to be processed in this processing (when the flag for the following file is raised), MPS signal, EOM signal, and so forth are transmitted to the receiver.

When all the files are processed, EOP signal is sent out and the termination process is completed (step 112 and 113). The termination process is the end of the calling process and the print processing of the transmission confirmation report. In the termination process, an address memory which has already been processed is cleared.

Figure 14:
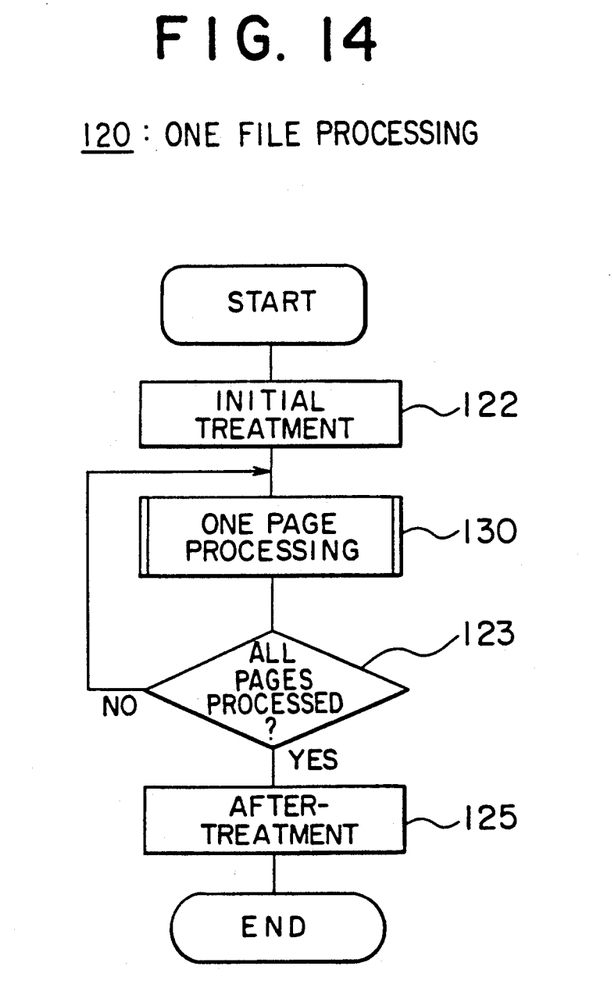

FIG. 14 illustrates the contents of one file processing 120. In this case, the setting of the information of the whole file and the setting of the information of the first page are performed (step 122) first.

The page counter is initialized and the total page number of the file is set by the setting of the information of the whole file. As the page counter is initialized at each file, the page number is put from the first page in numerical order at each file. In this example, the user ID is also set.

The setting of the page information of the first page is the setting of the line density and the document size. The line density can be changed at each page by the setting of page information.

Then, the processing step of first page 130 is called for. This processing is repeated over all pages (step 123). When all the pages are processed, the termination processing (the transmission of the transmission confirmation report) is conducted and this processing routine is completed (step 125).

With regard to the page information, the information of the present page is compared with that of the next page. When there is a difference, the processing mode is changed to a new one. This operation is conducted on the last page of the present file and the first page of the following file.

Figure 15:
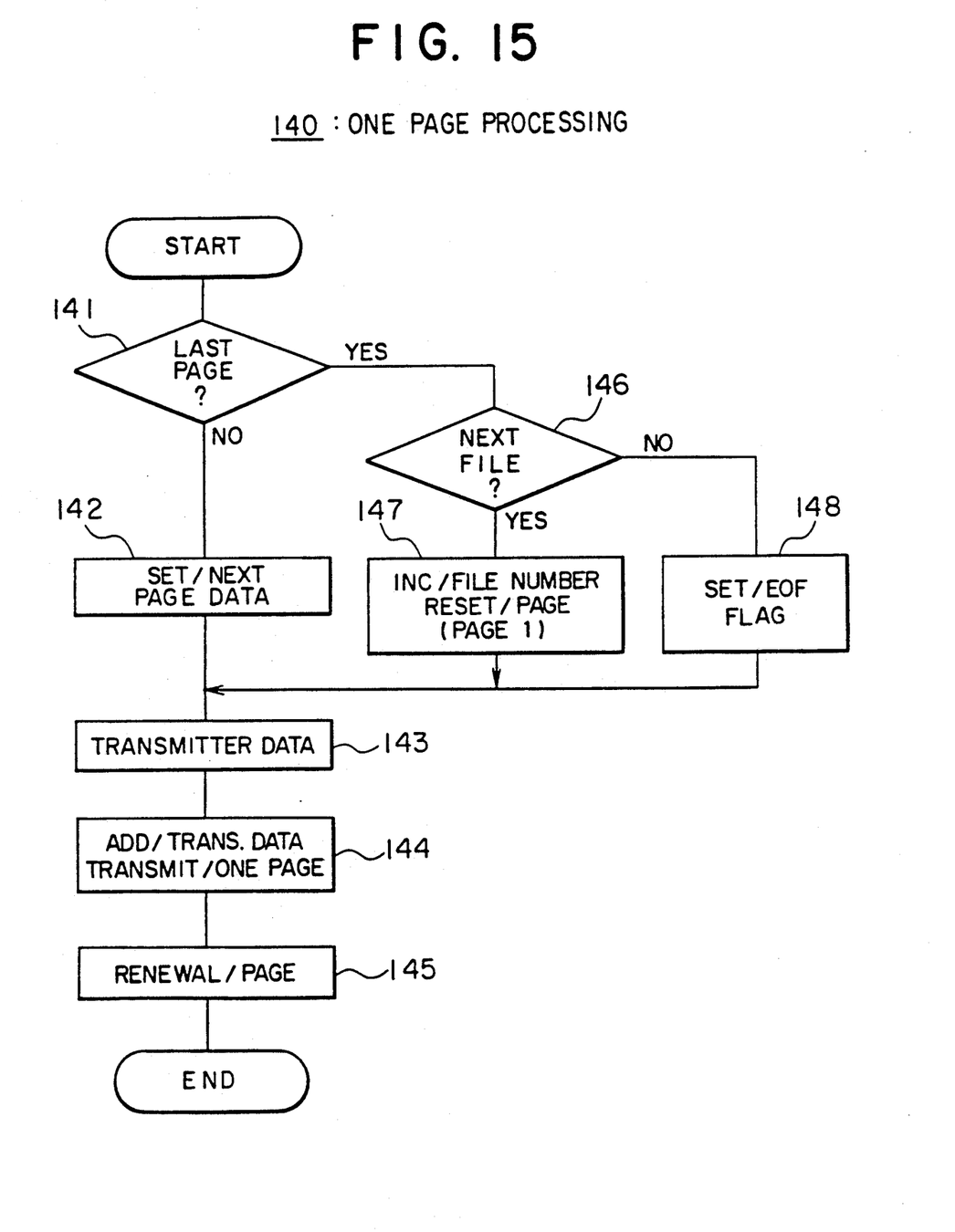
Figure 16:
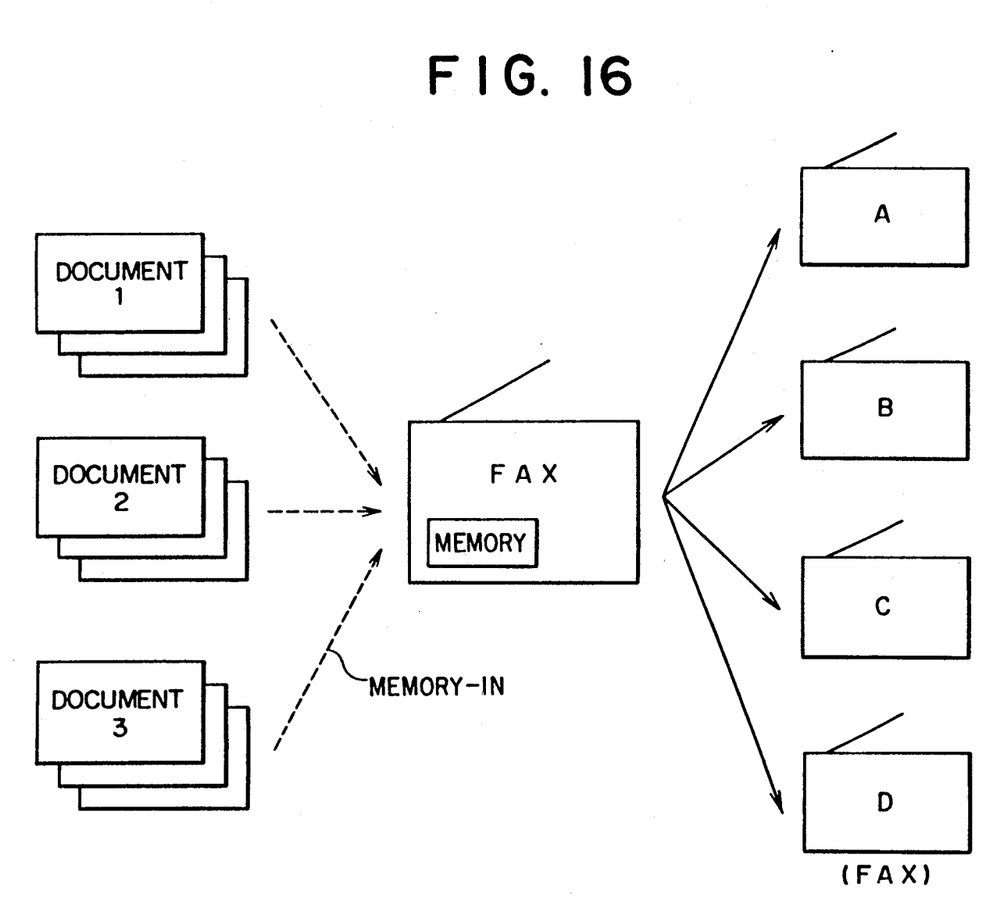
FIG. 16 is a schematic illustration which shows image transmission.

FIG. 15 illustrates the sub-routine of the page processing 140.

In this processing, whether the page is the last one or not, is checked. When it is not the last page, the information that the following page exists, is inputted. After that, the information about the sender is made and attached to the data. Then, an image data of a page is transmitted. After that, the page counter is renewed (steps 141 to 145).

When it is the last page, the following file is checked. When the following file exists, the information of the first page of the following file is attached to the following page information. After that, the process is transferred to step 143 and the same processing is continued (step 146 and 147). When the following file does not exist, the setting of the termination of processing all files is performed and the process is transferred to step 143 (step 148). The memory of the destination in J file is cleared and the data of the sequential communication report is updated.

The reason that the information of the sender is made and updated at each page is to keep positively the latest information when there is a communication error or electrical power failure.

As explained above, when the transmission is reserved in the present invention, the reservation number is displayed on the display unit and the reservation receipt is printed out.

Since the reservation number is displayed and the reservation receipt is printed out, cancelling the reservation, for example, can be designated by the reservation number and the contents of the reservation can be ensured by the reservation receipt. Accordingly, when the apparatus of the present invention is put into practical use, it is very convenient.

The apparatus of the present invention is further characterized in that when a plurality of files are transmitted in a lump, the identifying signal is automatically attached to each file which is stored in the memory.

As the apparatus of the present invention has the characteristics described above, when the page number is used as the identifier represented by the identifying signal, the page number is put on the sheets from the first page in numerical order at each file. Accordingly, the files can be easily distinguished.

When both of the page number and the user ID are used as the identifier, the user ID is attached to each file. Consequently, the sender can be identified in this case and the detailed information of the sender can be obtained at the receiver side.

Furthermore, as the apparatus of the present invention can attached the transmission confirmation report to each file, the receiver can easily and positively distinguish a plurality of files.

What is claimed is:

1. An image communication apparatus which is adapted to store a plurality of sets of image data and transmission conditions in a memory, and also is adapted to transmit the stored sets of image data according to the stored transmission conditions, wherein the transmission conditions include a transmission start time and destination data designating at least one receiver terminal, comprising:

means for obtaining each set of the image data by scanning each set of originals;

means for assigning the transmission conditions corresponding to each set of image data;

means for reserving each set of image data to be transmitted according to the transmission conditions of each set of image data;

means for generating a unique reservation number for each reserved set of image data;

means for displaying the reservation number of each reserved set of image data; and means for adding a unique identifier code to each set of image data;

means for storing the sets of image data, the transmission conditions and the identifier codes in a memory; and means for transmitting, in a batch, the stored sets of image data with identifier codes which have identical transmission start time and destination data to the receiver terminal designated by the destination data and at the transmission start time stored.

2. The image communication apparatus according to claim 1, further comprising:

means for printing out a receipt for each reserved set of image data.

* * * * *